United States Patent [19]
Duff et al.

[11] Patent Number: 5,322,754
[45] Date of Patent: * Jun. 21, 1994

[54] IMAGING MEMBERS CONTAINING TITANIUM PHTHALOCYANINES

[75] Inventors: James M. Duff, Mississauga; James D. Mayo, Toronto; Cheng-Kuo Hsiao; Ah-Mee Hor, both of Mississauga; Terry L. Bluhm, Oakville; Gordon K. Hamer; Peter M. Kazmaier, both of Mississauga, all of Canada

[73] Assignee: Xerox Corporation, Stamford, Conn.

[*] Notice: The portion of the term of this patent subsequent to Oct. 6, 2009 has been disclaimed.

[21] Appl. No.: 36,579

[22] Filed: Mar. 24, 1993

Related U.S. Application Data

[62] Division of Ser. No. 955,948, Oct. 5, 1992, Pat. No. 5,225,551, which is a division of Ser. No. 533,261, Jun. 4, 1990, Pat. No. 5,166,339.

[51] Int. Cl.$^5$ .............................. C09B 47/04
[52] U.S. Cl. ........................... 430/78; 540/141
[58] Field of Search ..................... 430/78; 540/141

[56] References Cited

U.S. PATENT DOCUMENTS 3,903,107 9/1975 Griffiths et al. .................. 430/78
5,153,313 10/1992 Kazmaier et al. ................. 430/76

Primary Examiner—Marion E. McCamish
Assistant Examiner—Mark A. Chapman
Attorney, Agent, or Firm—John L. Haack; Eugene O. Palazzo

[57] ABSTRACT

Disclosed is the X polymorphic form of titanyl phthalocyanine.

1 Claim, 4 Drawing Sheets

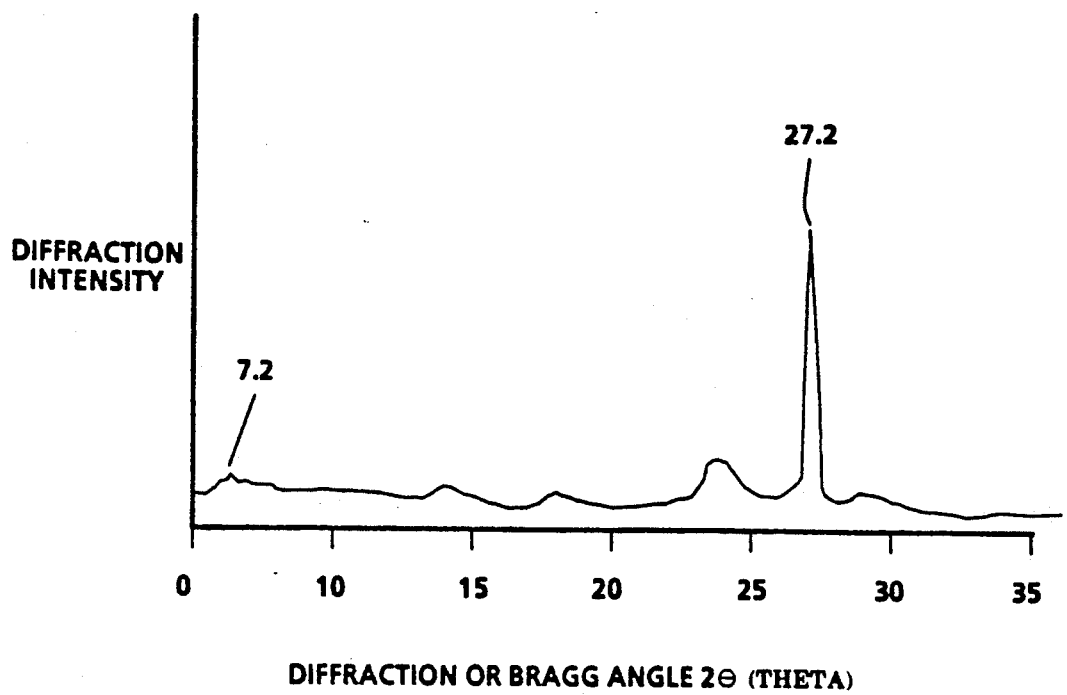
FIG. 4
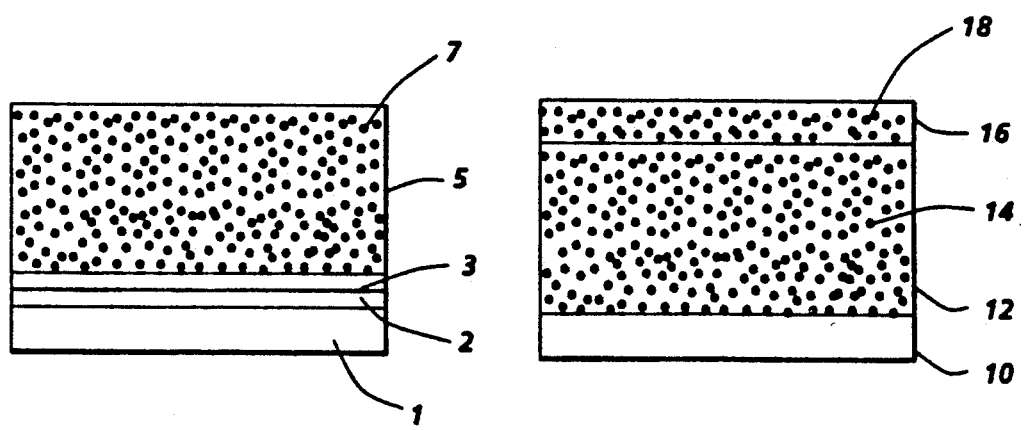
FIG. 5    FIG. 6

IMAGING MEMBERS CONTAINING TITANIUM PHTHALOCYANINES

This is a division of application Ser. No. 07/955,948, filed Oct. 5, 1992, now U.S. Pat. No. 5,228,551 which is in turn a division of Ser. No. 07/533,261, now U.S. Pat. No. 5,166,339, filed Jun. 4, 1990, and issued Nov. 24, 1992.

BACKGROUND OF THE INVENTION

This invention is generally directed to titanyl phthalocyanines and processes for the preparation thereof, and more specifically the present invention is directed to processes for obtaining titanyl phthalocyanine polymorphs or crystal forms, including the known Type I, Type II, Type III, and Type IV, reference for example U.S. Pat. No. 4,898,799, the disclosure of which is totally incorporated herein by reference, as well as novel crystal modifications thereof, such as X titanyl phthalocyanines, and layered photoconductive members comprised of the aforementioned titanyl phthalocyanine polymorphs. In one embodiment, the present invention is directed to a process for the preparation of titanyl phthalocyanines by initially providing a titanyl phthalocyanine, or accomplishing the preparation thereof by, for example, the reaction of titanium tetra(alkoxide) with diiminoisoindolene in a solvent such as chloronaphthalene; dissolving the resulting pigment in a solvent mixture of trifluoroacetic acid and methylene chloride; and thereafter precipitating the desired titanyl phthalocyanine polymorph by, for example, adding with stirring the aforementioned mixture to water, separating the product therefrom by, for example, filtration, and washing the product obtained. The titanyl phthalocyanines, especially the known polymorph IV and the X form, can be selected as organic photogenerator pigments in photoresponsive imaging members containing charge, especially hole transport layers such as arylamine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductor imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source. Titanyl phthalocyanines may also be selected as intense blue light-stable colorants for use in coatings, such as paint, inks, and as near infrared absorbing pigments suitable for use as IR laser optical recording materials.

Certain titanium phthalocyanine pigments have been known since at least prior to the publication WW 2(PB 85172 Fiat Final Report 1313, Feb. 1, 1948). However, unlike other phthalocyanines such as metal-free, copper, iron and zinc phthalocyanines, titanium phthalocyanines have had minimum commercial use. Titanyl phthalocyanines or oxytitanium phthalocyanines are known to absorb near-infrared light around 800 nanometers and a number of such pigments have been illustrated in the prior art as materials for IR laser optical recording material, reference for example BASF German 3,643,770 and U.S. Pat. No. 4,458,004. The use of certain titanium phthalocyanine pigments as a photoconductive material for electrophotographic applications is known, reference for example British Patent Publication 1,152,655, the disclosure of which is totally incorporated herein by reference. Also, U.S. Pat. No. 3,825,422 illustrates the use of titanyl phthalocyanine as a photoconductive pigment in an electrophotographic process known as particle electrophoresis. Additionally, the utilization of certain titanyl phthalocyanines and substituted derivatives thereof in a dual layer electrographic device is illustrated in EPO 180931, May 14, 1986. Moreover, the use of tetra- and hexadeca-flourosubstituted titanyl phthalocyanine in an electrophotographic device is illustrated in U.S. Pat. No. 4,701,396. In Japanese Patent Publication 64-171771, August, 1986, there is illustrated the use of titanyl phthalocyanine, which has been treated with a hot solvent, in electrophotography. Further, in German 3,821,628 there is illustrated the utilization of certain titanyl phthalocyanines, and other pigments in electrophotography, and wherein the titanyl phthalocyanines have been purified primarily to reduce the level of ash, volatile contaminants and sodium to below specified levels.

In the aforementioned documents, although synthesis and certain processing conditions were generally disclosed for the preparation of the titanyl phthalocyanine pigments, it is believed that there is no reference to certain crystal phases or polymorphs of the pigment. As mentioned in the textbook *Phthalocyanine Compounds* by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as Differential Scanning Calorimetry, Infrared Spectroscopy, Ultraviolet-Visible-Near Infrared spectroscopy and, especially, X-Ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances. For example, reference is made to alpha, beta, A, B, C, y, and m forms of TiOPc (titanyl phthalocyanine) with different names being used for the same form in some situations. It is believed that four main crystal forms of TiOPc are known, that is Types I, II, III, and IV. The X-ray powder diffraction traces (XRPDs) obtained from these 4 forms are shown in FIGS. 1A, 1B, 1C and 1D. Subclasses of these forms with broad, more poorly resolved peaks than those shown in FIGS. 1A, 1B, 1C and 1D can be envisioned, however, the basic features of the diffractograms indicate the major peaks in the same position although the smaller peaks can be unresolved. This broadening of XRPD peaks is generally found in pigments having a very small particle size. In Table 1 that follows, there is provided a listing of documents that disclose titanyl phthalocyanine polymorphic forms classified as belonging to one of the main types as indicated.

TABLE 1

| Crystal Form | Other Names | Documents |
|---|---|---|
| Type I | β | Toyo Ink Electrophotog. (Japan) 27, 533 (1988) |
| | β | Dainippon US 4,728,592 |
| | β | Sanyo-Shikiso JOP 63-20365 |
| | A | Mitsubishi JOP 62-25685, -6, -7 Conference Proceedings |
| | A | Konica "Japan Hardcopy 1989", 103, (1989) |
| Type II | α | Toyo Ink "Electrophoto (Japan)" 27, 533 (1988) |
| | α | Sanyo-Shikiso JOP 63-20365 |
| | α | Konica US 4,898,799 |
| | α | Dainippon US 4,728,592 |
| | α | Mita EU 314,100 |
| | B | Mitsubishi JOP 62-25685, -6, -7 |
| | B | Konica "Japan Hardcopy 1989, 103, (1989) |
| Type III | C | Mitsubishi OP 62-25685, -6, -7 |
| | C | Konica "Japan Hardcopy 1989, 103, (1989) |
| | m | Toyo Ink "Electrophoto (Japan)" 27, 533 (1988) |
| Type IV | y | Konica "Japan Hardcopy 1989", 103, (1989) |
| | Unnamed | Konica US 4,898,799 |
| | New Type | Sanyo-Shikiso JOP 63-20365 |

More specifically, the aforementioned documents illustrate, for example, the use of specific polymorphs of TiOPc in electrophotographic devices. Three crystal forms of titanyl phthalocyanine, differentiated by their XRPDs, were specifically illustrated, identified as A, B, and C, which it is believed are equivalent to Types I, II, and III, respectively. In Japanese 62-256865 there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method to the latter except that the time to heat the mixture at from 100° to 170° C., is maintained for at least two and one half hours. Types I and II, in the pure form obtained by the process of the above publications, apparently afforded layered photoresponsive imaging members with excellent electrophotographic characteristics.

In Mita EPO patent publication 314,100, there is illustrated the synthesis of TiOPc by, for example, the reaction of titanium alkoxides and diiminoisoindolene in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the electric charge generating layer in layered photoresponsive imaging members with a high photosensitivity at, for example, 780 nanometers.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine, which is apparently not named. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 1 for the Type IV polymorph.

In U.S. Pat. No. 4,728,592, there is illustrated, for example, the use of alpha ype TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a much poorer quality photoreceptor.

In Konica Japanese 64-17066/89, there is disclosed, for example, the use of a new crystal modification of TiOPc prepared from alpha ype pigment (Type II) by milling it in a sand mill with salt and polyethylene glycol. This pigment had a strong XRPD peak at a value of 2 theta of 27.3 degrees. This publication also discloses that this new form differs from alpha ype pigment (Type II) in its light absorption and shows a maximum absorbance at 817 nanometers compared to alpha-type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this application to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, *Electrophotography* (Japan) vol. 27, pages 533 to 538, Toyo Ink Manufacturing Company, there is disclosed, for example, alpha and beta forms of TiOPc (Types I and II, it is believed) and also this journal discloses the preparation of a Type m TiOPc, an apparently new form having an XRPD pattern which was distinct from other crystal forms. It is believed that his XRPD is similar to that for the Type III titanyl phthalocyanine pigment but it is broadened most likely as the particle size is much smaller than that usually found in the Type III pigment. This pigment was used to prepare photoreceptor devices having greater sensitivity at 830 nanometers than alpha or beta Type TiOPc (Type II or I, respectively).

Processes for the preparation of specific polymorphs of titanyl phthalocyanine, which require the use of a strong acid such as sulfuric acid, are known, and these processes, it is believed, are not easily scable. One process as illustrated in Konica Japanese Laid Open on Jan. 20, 1989 as 64-17066 (U.S. Pat. No. 4,898,799 appears to be its equivalent), the disclosure of which is totally incorporated herein by reference, involves, for example, the reaction of titanium tetrachloride and phthalodinitrile in 1-chloronaphthalene solvent to produce dichlorotitanium phthalocyanine which is then subjected to hydroylsis by ammonia water to enable the Type II polymorph. This phthalocyanine is preferably treated with an electron releasing solvent such as 2-ethoxyethanol, dioxane, N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon, such as chlorobenzene solvent to an aqueous suspension of Type II titanyl phthalocyanine prepared by the well-known acid pasting process, and heating the resultant suspension to about 50° C. as disclosed in Sanyo-Shikiso Japanese 63-20365, Laid Open in Jan. 28, 1988. In Japanese 171771/1986, Laid Open Aug. 2, 1986, there is disclosed the purification of metallophthalocyanine by treatment with N-methylpyrrolidone.

To obtain a TiOPc-based photoreceptor having high sensitivity to near infrared light, it is believed necessary to control not only the purity and chemical structure of the pigment, as is generally the situation with organic photoconductors, but also to prepare the pigment in the correct crystal modification. The disclosed processes used to prepare specific crystal forms of TiOPc, such as Types I, II, III and IV are either complicated and difficult to control as in the preparation of pure Types I and II pigment by careful control of the synthesis parameters by the processes described in Mitsubishi Japanese 62-25685, -6 and -7, or involve harsh treatment such as sand milling at high temperature, reference Konica U.S. Pat. No. 4,898,799; or dissolution of the pigment in a large volume of concentrated sulphuric acid, a solvent which is known to cause decomposition of metal phthalocyanines, reference Sanyo-Shikiso Japanese 63-20365, and Mita EPO 314,100.

In the present application, there is disclosed, for example, in one embodiment an economical method for the preparation of polymorphs of TiOPc, specifically the Type I, II, III and IV polymorphs, and at least three new crystal forms which have not been described previously. This method is an improvement over the prior art in that, for example, in embodiments thereof it is not complex, is rapid, does not require the use of harsh reagents such as sulfuric acid or the use of energy intensive processes such as sand milling. The process of the present invention in one embodiment involves dissolving Type I titanyl phthalocyanine (TiOPc), prepared, for example, by the reaction of diiminoisoindolene with titanium tetrapropoxide in a N-methylpyrrolidone solvent in a solvent composition comprised of a strong organic acid such as trifluoroacetic acid and a solvent such as methylene chloride (the titanyl phthalocyanine pigment is highly soluble in this mixture, dissolves within minutes and is stable for at least about two weeks); followed by a reprecipitation of the pigment into a second solvent system. The composition of the precipitant solvent primarily determines which polymorphic form of TiOPc can be obtained. The desired polymorphic form can be isolated by a simple filtration process and can be washed with water and/or organic solvents to attain a suitable degree of purity.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanies, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

Photoresponsive imaging members with squaraine photogenerating pigments are also known, reference U.S. Pat. No. 4,415,639. In this patent there is illustrated a photoresponsive imaging member with a substrate, a hole blocking layer, an optional adhesive interface layer, an organic photogenerating layer, a photoconductive composition capable of enhancing or reducing the intrinsic properties of the photogenerating layer, and a hole transport layer. As photoconductive compositions for the aforementioned member, there can be selected various squaraine pigments, including hydroxy squaraine compositions. Moreover, there is disclosed in U.S. Pat. No. 3,824,099 certain photosensitive hydroxy squaraine compositions.

The use of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

Moreover, there are disclosed in U.S. Pat. No. 4,419,427 electrographic recording mediums with a photosemiconductive double layer comprised of a first layer containing charge carrier perylene diimide dyes, and a second layer with one or more compounds which are charge transporting materials when exposed to light, reference the disclosure in column 2, beginning at line 20. Also of interest with respect to this patent is the background information included in columns 1 and 2, wherein perylene dyes of the formula illustrated are presented.

Furthermore, there is presented in U.S. Pat. No. 4,514,482, entitled Photoconductive Devices Containing Perylene Dye Compositions, the disclosure of which is totally incorporated herein by reference, an ambipolar imaging member comprised of a supporting substrate, a photoconductive layer comprised of specific perylene dyes, which dyes are dispersed in a polymeric resinous binder composition; and as a top layer a specific aryl amine hole transporting substance dispersed in an inactive resinous binder.

In a copending application U.S. Ser. No. 537,714, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example, U.S. Pat. No. 4,429,029 mentioned hereinbefore.

In copending application U.S. Ser. No. 533,265, the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

The disclosures of all of the aforementioned publications, laid open applications, and patents are totally incorporated herein by reference.

SUMMARY OF THE INVENTION

It is an object of the present invention to provide processes for the preparation of titanyl phthalocyanines with many of the advantages illustrated herein.

It is yet another feature of the present invention to provide economically scalable processes for the preparation of titanyl phthalocyanines.

Another feature of the present invention relates to the preparation of titanyl phthalocyanine polymorphs, including those known as Type I, Type II, and Type IV.

Further, another feature of the present invention relates to the preparation of photogenerating titanyl phthalocyanines by the solubilization of titanyl phthalocyanines followed by reprecipitation into solvent compositions.

Moreover, another feature of the present invention relates to the preparation of titanyl phthalocyanines with high purities, and the use thereof in electrophotographic processes.

Additionally, another feature of the present invention relates to the preparation of titanyl phthalocyanine polymorphs in acceptable yields of, for example, exceeding about 75 percent in embodiments of the present invention.

Yet another feature of the present invention is the high degree of versatility of the described process in that it can allow the preparation of at least 7 different polymorphs of TiOPc with minor modifications of the process.

Another feature of the present invention is that the process described herein in an embodiment allows the preparation of a new crystal form of TiOPc, designated X-form, which is distinguishable from previously described forms on the basis of its XRPD pattern, reference, for example, FIG. 4.

Additionally, another feature of the present invention is that the process allows the preparation of a new crystal form of TiOPc, Type Z-1 having the XRPD pattern shown in FIG. 2.

Yet another feature of the present invention is the provision of processes that affords a crystal form of TiOPc, Type Z-2 having the XRPD pattern shown in FIG. 3.

Another feature of the present invention is that it provides for the preparation of TiOPc polymorphs having a small particle size of about 0.1 micron which is advantageous for the preparation of electrophotographic devices since, for example, it can be easily dispersed in coating compositions.

Another feature of the present invention in an embodiment thereof resides in the preparation of TiOPc polymorphs having a small particle size of about 0.1 micronswhich is advantageous for the preparation of electrophotographic devices since, for example, the prepared polymorphs can be easily dispersed in coating compositions.

Yet another feature of the present invention is that mild conversion conditions can be selected which do not cause decomposition of the titanyl phthalocyanine pigment.

A further specific object of the present invention resides in the provision of photoresponsive imaging members with an aryl amine hole transport layer, and a photogenerator layer comprised of titanyl phthalocyanine pigment obtained by the processes illustrated herein.

A further specific object of the present invention resides in the provision of photoresponsive imaging members with an aryl amine hole transport layer, and a photogenerator layer comprised of the titanyl phthalocyanine pigments X-form, Type Z-1, or Type Z-2.

These other objects and features of the present invention are accomplished in embodiments thereof by the provision of certain phthalocyanines, processes for the preparation of titanyl phthalocyanines and photoresponsive imaging members thereof. More specifically, in one embodiment of the present invention there are provided processes for the preparation of titanyl phthalocyanine (TiOPc) polymorphs which comprises the solubilization of a titanyl phthalocyanine in a mixture of trifluoroacetic acid and methylene chloride, precipitation of the desired titanyl phthalocyanine, such as Type IV, separation by, for example, filtration, and optionally subjecting the product to washing. The product can be identified by various known means including X-ray powder diffraction, (XRPD).

One embodiment of the present invention is directed to processes for the preparation of titanyl phthalocyanines, which comprise the reaction of titanium tetrapropoxide with diiminoisoindolene in N-methylpyrrolidone solvent to provide Type I, or β-type titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product.

Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide; titanium tetraalkoxides such as titanium tetra-methoxide, -ethoxide, -propoxide-, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof.

As the solvent mixture, there can be selected a strong organic acid, such as a trihaloacetic acids, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment of the present invention, a preferred solvent mixture is comprised of trifluoroacetic acid and methylene chloride in a ratio of from about 5 parts acid to about 95 parts methylene chloride to 25 parts acid to 75 parts of methylene chloride.

Subsequent to solubilization with the above solvent mixture and stirring for an effective period of time of, for example, from about 5 minutes to several days, the resulting mixture is added to a solvent that will enable precipitation of the desired titanyl phthalocyanine polymorph, such as Type IV, which solvent is comprised of an alcohol such as an alkylalcohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as chlorobenzene, and the like; carbonyl compounds such as ketones such as acetone, methyl ethyl ketone, and butyraldehyde; glycols such as ethylene and propylene glycol and glycerol; polar aprotic solvents such as dimethyl sulfoxide, dimethylformamide and N-methylpyrrolidone; and water, as well as mixtures of the aforementioned solvents, followed by filtration of the titanyl phthalocyanine polymorph, and washing with various solvents such as, for example, deionized water and an alcohol such methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine polymorph, the form of which was determined by the composition of the precipitant solvent. The polymorphic form and purity of the product was determined by XRPD analysis.

In an embodiment of the present invention, there is provided a process for the preparation of titanyl phthalocyanine polymorphs, which comprises: 1) dissolving the precursor pigment, which can be any crystal form of TiOPc, in a mixture of trifluoroacetic acid and methylene chloride comprised of from 5 percent acid to about 25 percent acid and 95 parts to 75 parts of methylene chloride, wherein the amount of precursor pigment is, for example, from 5 parts to about 25 parts of the precursor pigment to 100 parts of acid solution, by adding the pigment to the solution and stirring the mixture for an effective period of time, for example from about 5 minutes to several days, and in an embodiment about two weeks, at a temperature of from about 0° to about 50° C.; 2) pouring or adding the resultant solution into a rapidly stirred precipitant solvent in a ratio of from about 1 part of the aforementioned pigment solution to 2 parts of precipitant solution to about 1 part pigment solution to about 50 parts of precipitant at a temperature of from about 0° to about 100° C. over a period of from 1 minute to about 60 minutes to ensure rapid efficient mixing in an embodiment, the precipitant solution was stirred at a rate sufficient to form a deep vortex in the reaction vessel, and the pigment was poured in a slow stream into the side of the vortex; 3) following the addition, the resultant dispersion of the desired polymorphic form of TiOPc was stirred at a temperature of from 0° to about 100° C. for a period of from about 5 minutes to about 24 hours; 4) subsequently separating the titanyl phthalocyanine from the mother liquor by filtration, for example through a glass fiber filter in a porcelain filter funnel, and washing the product titanyl phthalocyanine pigment in the funnel with an effective amount of solvent, for example from about 20 parts of wash solvent to about 1 part of the starting pigment, such as methanol, to remove most of the acidic mother liquor; 5) redispersing the resulting wet cake in a solvent, such as methanol, acetone, water, and the like in an effective amount of, for example, from about 20 parts to about 100 parts of solvent to 1 part of the pigment for a period of from about 5 minutes to 24 hours at a temperature of from 0° C. to about 100° C., the primary purpose of such washing being to further remove any residual acid or other impurities from the particular polymorphic form of TiOPc which resulted from the precipitation process; 6) isolating the desired titanyl phthalocyanine polymorph by, for example, filtration through a glass fiber filter as in step (4), and subsequently optionally washing the solid product in the funnel with a solvent, such as water methanol or acetone, and the like to complete purification. The final product can be obtained after the solid has been dried at a temperature of from about 25 to about 150° C. for a time of 1 hour to about 24 hours, for example either in the air or under vacuum. A yield corresponding to about 95 percent to about 75 percent of the weight of the starting pigment can obtained. The polymorphic form of the final pigment was determined by XRPD analysis, reference Table 2.

A typical small-scale conversion reaction was accomplished in an embodiment of the present invention as follows:

Two grams of titanyl phthalocyanine synthesized by the process of Example I, below, was dissolved in 20 milliliters of a 1:4 mixture (V/V) of trifluoroacetic acid in methylene chloride by stirring in a 25 milliliters Erlenmeyer flask at room temperature for 5 minutes. The resultant dark green solution, which did not contain any undissolved material, was then poured into 200 milliliters of methanol in a 250 milliliter Erlenmeyer flask with vigorous stirring at room temperature. The resultant dark blue suspension was stirred at room temperature for an additional 30 minutes and then was filtered through a 4.25 centimeter glass fiber filter (Whatman GF/A grade) and the solid was washed on the funnel with about 20 milliliters of methanol. The resultant wet filter cake was transferred to a 125 milliliter flask and was redispersed in 50 milliliters of methanol. The resulting dispersion was stirred for 30 minutes, then was refiltered as above, and the solid resulting was washed on the funnel with methanol (20 milliliters) then water (2×20 milliliters) and finally with methanol again (20 milliliters). The solid was dried at 70° C. for 2 hours to yield about 1.8 grams of dark blue pigment. This was determined to be a new polymorphic form of TiOPc, designated herein as Type Z-1, reference the XRPD pattern of FIG. 2.

TABLE 2

EFECT OF PRECIPITANT SOLVENT ON POLYMORPHISM
Standard Experiment: 2 grams of TiOPc in 20 milliliters 1:4 CF$_3$CO$_2$H/CH$_2$Cl$_2$ poured into 200 milliliters of precipitant solvent

| PRECIPITANT | XRPD ANALYSIS |
|---|---|
| Water | Type IV |
| Methanol | Type Z-1 |
| 1:1 Methanol/Water | Type X |
| 95:5 Methanol/Water | Type III (major) |
| Isopropanol | Type II |
| Diethyl Ether | Type I |
| 1:1 Toluene/Water | Type IV |
| 1:1 Chlorobenzene/Water | Type IV |
| 1:1 Acetone/Water | Type III (major) |
| 1:1 Ethanol/Water | Type X |
| 1:1 Isopropanol/Water | Type IV |
| 1:1 Ethylene Glycol/Water | Type Z-2 |
| 1:1 Dimethylformamide/Water | Type III + Type IV |
| 1:1 Dimethylsulfoxide/Water | Type III + Type IV |

*Hitherto unreported crystal forms

When the above procedure was repeated with a series of different precipitants as illustrated in Table 2, the polymorphic form obtained was found to depend on the nature of the precipitant solvent. Thus, either of the known forms (Type I, II, III or IV) could be obtained as shown in Table 2. These were identified by comparing their XRPDs to those of the known forms shown in FIGS. 1A, 1B, 1C and 1D. Precipitation into ethylene glycol.water (1:1) also provided a hitherto undescribed polymorph of TiOPc, designated as Type Z-2, the XRPD of which is shown in FIG. 3. A third new Type of titanyl phthalocyanine, obtained from a 50:50 mixture of methanol or ethanol with water and which has been found to afford xerographic devices having very high sensitivity to 780 nanometers light, identified herein as the X form, had the XRPD pattern shown in FIG. 4. Although the new Type X polymorph is similar to the Type IV TiOPc in that it shows its strongest peak at the Bragg angle 2 theta=27.3 degrees, it differs substantially from Type IV in that the peaks at about 2 theta=9.5 and 9.7 degrees, which are quite pronounced in the XRPD of Type IV titanyl phthalocyanine pigment and are absent in the Type X material. Additionally, a peak in the Type X form at 2 theta=about 7.4 degrees is relatively much more pronounced (compared to other peaks in the diffractograph) than the same peak in the Type IV XRPD shown in FIG. 1D. While these are the most predominant differences between the Type IV and Type X polymorphs, other more subtle differences apparent to those familiar with the interpretation of X-ray diffraction are also noticeable. Additionally, the X form shows broad diffraction peaks at 2 theta values of 14.1 and 17.8 degrees. The 2 theta values reported refer to diffraction of Cu alpha radiation (wavelength=0.1542 nonometers).

In another embodiment of the present invention, solutions of TiOPc in a 1:4 mixture of trifluoroacetic acid and methylene chloride were precipitated into varying mixtures of methanol and water ranging from 100 percent methanol to 100 percent water. Following the above described isolation, the samples were analyzed by XRPD, and the results are provided in Table 3 that follows.

TABLE 3

| Precipitant Solvent Ratio MeOH/H$_2$O | XRPD Analysis |
|---|---|
| 100:0 | Type Z-1 |
| 95:5 | Type III (major) |
| 90:10 | Type III (major) |
| 85:15 | Type III (major) |
| 80:20 | Type III (major) |
| 75:25 | Type III (major) |
| 70:30 | Type III (major) |
| 65:35 | Type III (minor) + Type X |
| 60:40 | Type X |
| 55:45 | Type X |
| 50:50 | Type X |
| 45:55 | Type X |
| 40:60 | Type X |
| 35:65 | Type X |
| 30:70 | Type IV |
| 25:75 | Type IV |
| 20:80 | Type IV |
| 0:100 | Type IV |

The data in this Table illustrate that at relatively high methanol concentrations the preponderant polymorph formed is the Type III form. However, beginning at a composition of about 65 percent methanol 35 percent water the Type X form predominates. Polymorphically pure Type X is obtained when the acid solution is precipitated into methanol/water compositions ranging from 60 to 35 percent methanol. Compositions containing less than about 35 percent methanol and pure water result in the formation of the Type IV form which has the XRPD peaks at 2 theta=9.8 degrees.

Another embodiment of the present invention is directed to a process for the preparation of titanyl phthalocyanine, which comprises the reaction of diiminoisoindolene in a ratio of from 3 to 5 molar equivalents with 1 molar equivalent of titanium tetrapropoxide in chloronaphthalene or N-methylpyrrolidone solvent in a ratio of from about 1 part diiminoisoindolene to from about 5 to about 10 parts of solvent. These ingredients are stirred and warmed to a temperature of from about 160° to 240° C. for a period of from about 30 minutes to about 8 hours. After this time the reaction mixture is cooled to a temperature of from about 100° to 160° C. and the mixture is filtered through a sintered glass funnel (M porosity). The pigment is washed in the funnel with boiling dimethyl formamide (DMF) solvent in an amount which is sufficient to remove all deeply colored impurities from the solid as evidenced by a change in the color of the filtrate from an initial black color to a faint blue green. Following this, the pigment is stirred in the funnel with boiling DMF in a sufficient quantity to form a loose suspension, and this is refiltered. The solid is finally washed with DMF at room temperature, then with a small amount of methanol and is finally dried at about 70° C. for from about 2 to about 24 hours. Generally, an amount of DMF equal to the amount of solvent (chloronaphthalene or N-methylpyrrolidone) used in the synthesis reaction is required for the washing step. The yield from this synthesis is from 60 to about 80 percent. X-ray powder diffraction, XRPD, analysis of the product thus obtained indicated that it was the Type I polymorph, or $\beta$ Type titanyl phthalocyanine.

In specific embodiments of the present invention, the following can be accomplished:

Five grams of Type I TiOPc can be dissolved in 100 milliliters of a 1:4 mixture (v/v) of trifluoroactic acid (TFA) and methylene chloride ($CH_2Cl_2$) to provide a dark green solution containing no undissolved TiOPc. The resulting solution was then divided into 5×20 milliliter portions.

A 20 milliliter portion of the above prepared solution was poured over about a 2 minute period into 100 milliliters of a well stirred solution of methanol in water (1:1, v/v). The resultant dark blue precipitate was vacuum filtered through a 4.25 centimeter glass fiber paper in a Büchner funnel. The solid was washed on the funnel with:

a) 20 milliliters of 1:1 (v/v) water/methanol
b) 3×10 milliliter portions of methanol
c) 3×5 milliliter portions of deionized water
d) 2×5 milliliter portions of methanol The resulting solid was dried at 70° C. for 16 hours to yield 0.95 gram of dark blue pigment. An XRPD analysis of this material showed that it was the Type X polymorphic form of TiOPc.

A second portion, 20 milliliter aliquot, of the above prepared TFA/$CH_2Cl_2$ solution was poured into 100 milliliters of isopropyl alcohol. The resulting precipitated blue powder was isolated and dried as indicated herein except that the first washing used 20 milliliters of isopropanol. The product, 0.93 gram of blue powder, was identified as Type II TiOPc by XRPD.

A third portion, 20 milliliter aliquot, of the above prepared solution was poured into 100 milliliters of diethyl ether and the precipitated product was isolated as indicated herein except that the first wash used 20 milliliters of diethyl ether. The resultant 0.82 gram of blue powder was identified as Type I TiOPc by XRPD.

A fourth portion, 20 milliliters aliquot, of the above prepared TFA/$CH_2Cl_2$ solution was added to 100 milliliters of chlorobenzene. A dark green solution was obtained. This was treated with 20 milliliters of water with vigorous stirring and the resultant suspension was further processed as indicated herein except that the initial washing step, a), was omitted to yield 0.93 gram of blue pigment which was shown to be Type IV TiOPc by XRPD.

A fifth portion, 20 milliliters, of the above TFA/$CH_2Cl_2$ solution was poured over a 1 minute period into a vigorously stirred suspension of toluene in water (1:1, v/v). The precipitated solid was isolated exactly as indicated herein. The product was 0.93 gram of blue solid which was identified as Type IV TiOPc by XRPD.

Type II TiOPc, as determined by XRPD, was synthesized by acid pasting a sample of the Type I pigment in concentrated sulfuric acid. A 1.05 grams sample of the resulting material was dissolved in 20 milliliters of a 1:4 mixture of trifluoroacetic acid and methylene chloride. The resulting solution was poured into 200 milliliters of a 1:1 mixture of methanol and water. The precipitated solid was isolated exactly as indicated herein for Type X TiOPc to provide 1.02 gram of blue pigment identified as Type X TiOPc by XRPD.

Numerous different layered photoresponsive imaging members with the phthalocyanine pigments obtained by the processes of the present invention can be fabricated. In one embodiment, thus the layered photoresponsive imaging members are comprised of a supporting substrate, a charge transport layer, especially an aryl amine hole transport layer, and situated therebetween a photogenerator layer comprised of titantyl phthalocyanine of Type X, Type Z-1, Type Z-2 or Type IV. Another embodiment of the present invention is directed to positively charged layered photoresponsive imaging members comprised of a supporting substrate, a charge transport layer, especially an aryl amine hole transport layer, and as a top overcoating titanyl phthalocyanine pigments Type X or Type IV obtained with the processes of the present invention. Moreover, there is provided in accordance with the present invention an improved negatively charged photoresponsive imaging member comprised of a supporting substrate, a thin adhesive layer, a titanyl phthalocyanine obtained by the processes of the present invention photogenerator dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is carried out in such a manner that the final coating thickness is from 0.01 to about 30 microns after it has dried. The fabrication conditions for a given layer will be tailored to achieve optimum performance and cost in the final device.

Imaging members with the titanyl phthalocyanine pigments of the present invention are useful in various electrostatographic imaging and printing systems, particularly those conventionally known as xerographic processes. Specifically, the imaging members of the present invention are useful in xerographic imaging processes wherein the titanyl phthalocyanines pigments absorb light of a wavelength of from about 600 nanometers to about 900 nanometers. In these known processes, electrostatic latent images are initially formed on the imaging member followed by development, and thereafter transferrng the image to a suitable substrate.

Moreover, the imaging members of the present invention can be selected for electronic printing processes with gallium arsenide light emitting diode (LED) arrays which typically function at wavelengths of from 660 to about 830 nanometers.

BRIEF DESCRIPTION OF THE DRAWINGS

For a better understanding of the present invention and further features thereof, reference is made to the following detailed description of various preferred embodiments wherein:

FIG. 4 is a diffractograph of the XRPD of the new Type X polymorph titanyl phthalocyanine;

FIG. 5 is a partially schematic cross-sectional view of a negatively charged photoresponsive imaging member of the present invention; and FIG. 6 is a partially schematic cross-sectional view of a positively charged photoresponsive imaging member of the present invention.

DESCRIPTION OF THE PREFERRED EMBODIMENTS

Figure 1A:
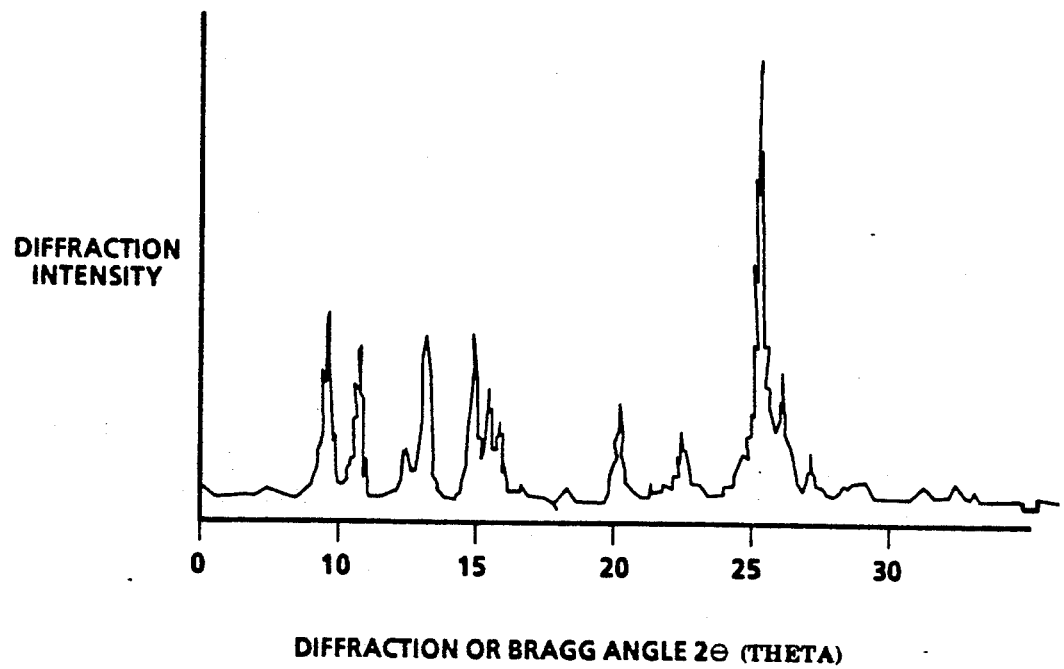
FIGS. 1A, 1B, 1C and 1D are diffractograph summaries of the XRPDs of the known polymorphs, Type I, II, III and IV of titanyl phthalocyanine.
Figure 1B:
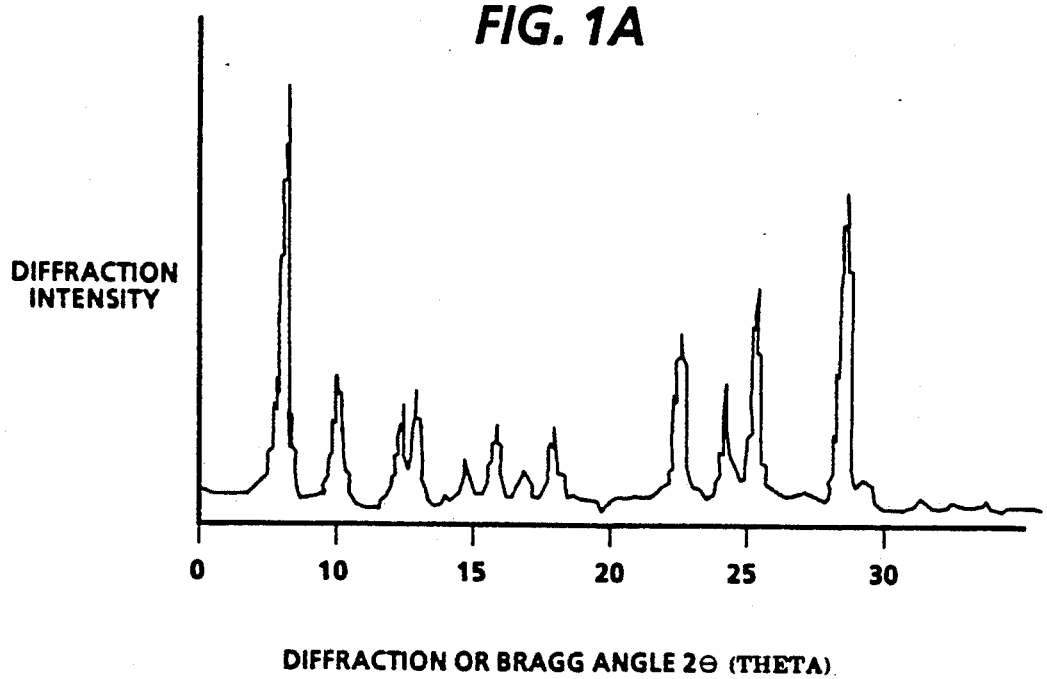
Figure 1C:
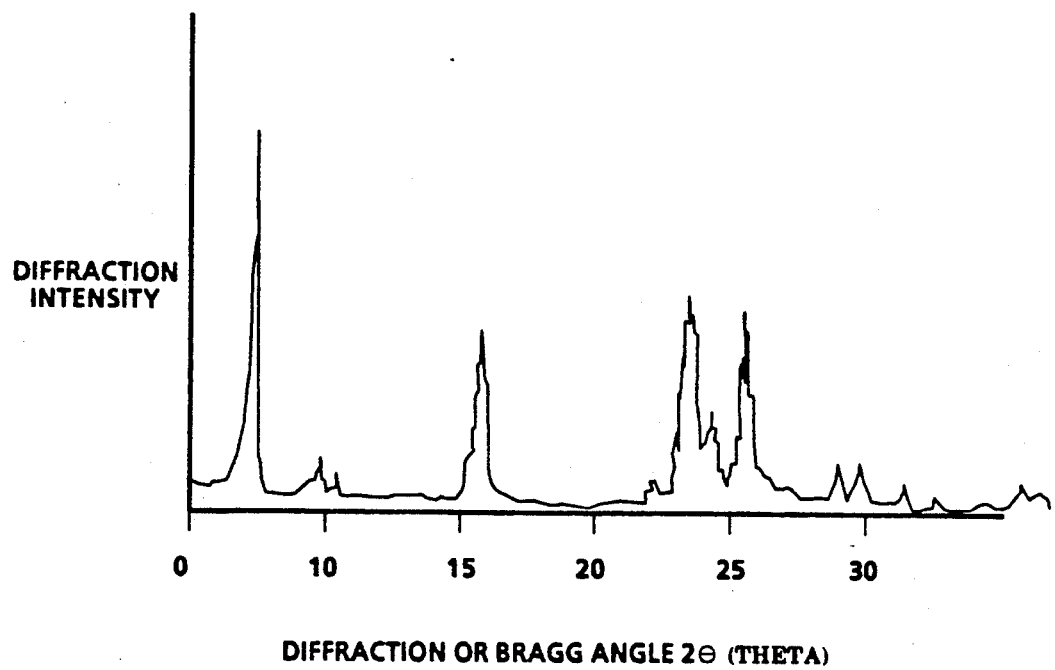
Figure 1D:
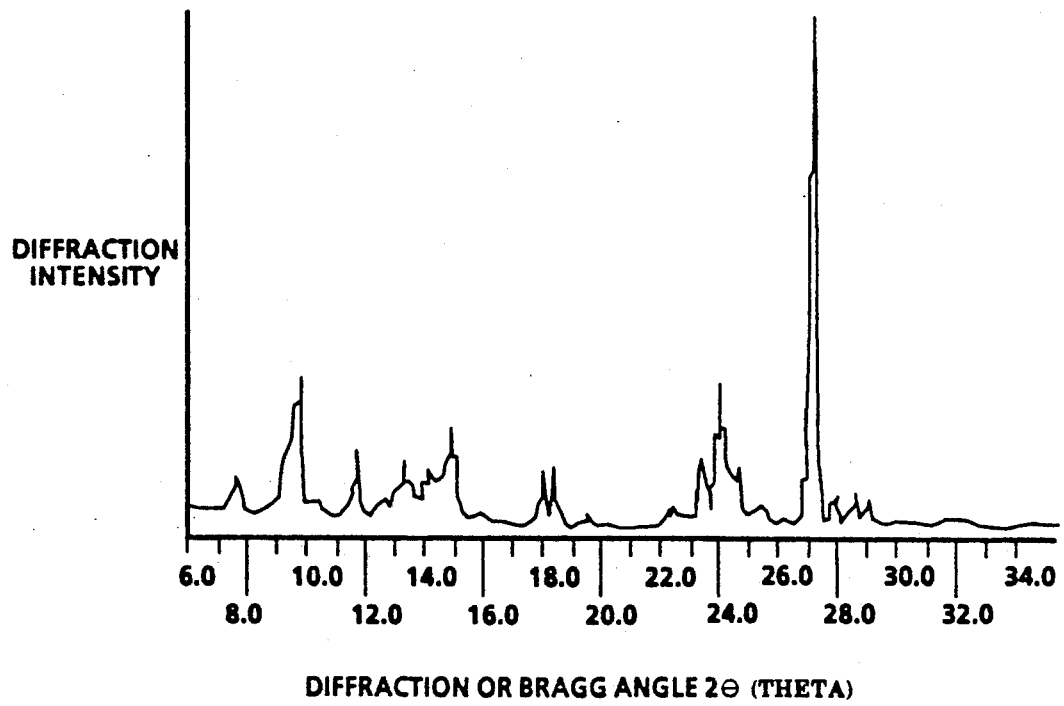
Figure 2:
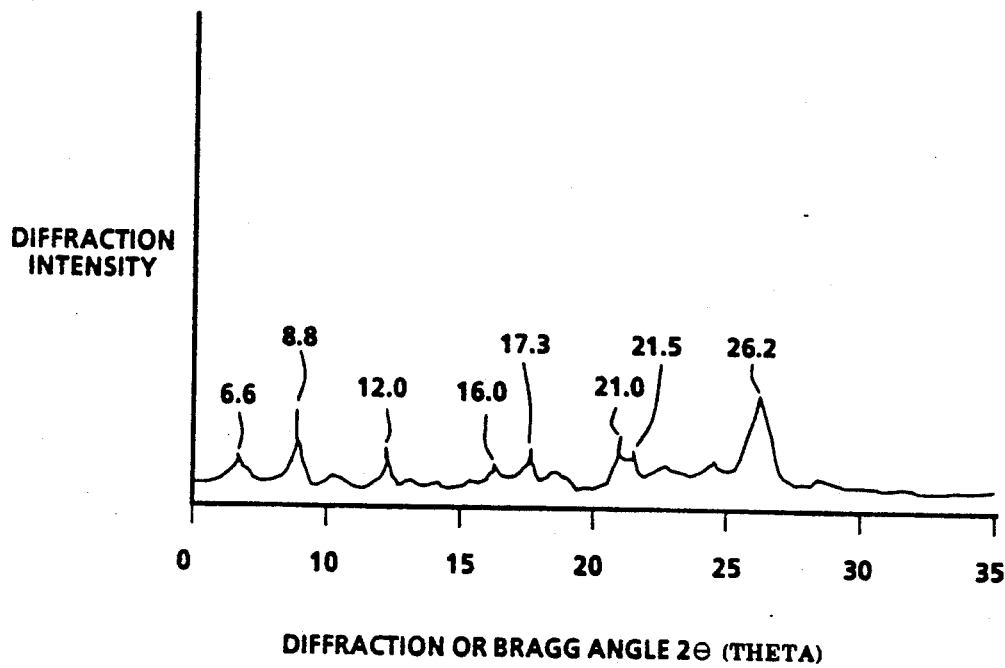
FIG. 2 is a diffractograph of the XRPD of the new Z-1 crystal form of titanyl phthalocyanine obtained, for example, from precipitation into 100 percent methanol.
Figure 3:
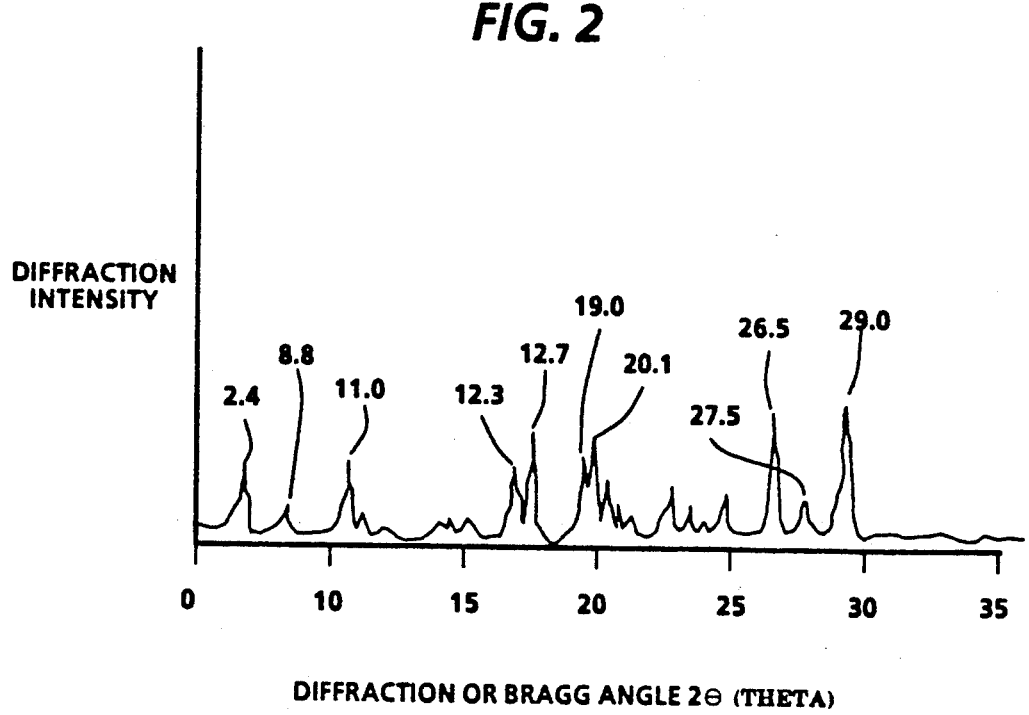
FIG. 3 is a diffractograph of the XRPD of the new Z-2 crystal form of titanyl phthalocyanine obtained, for example, by precipitation into water/ethylene glycol.

Illustrated in FIG. 5 is a negatively charged photoresponsive imaging member of the present invention comprised of a supporting substrate 1, a solution coated adhesive layer 2 comprised, for example, of a polyester 49,000 available from Goodyear Chemical, a photogenerator layer 3 comprised of titanyl phthalocyanine, such as Type IV, Type Z-1, Z-2, or X obtained with the process of the present invention, reference Example IV for example, optionally dispersed in an inactive resinous binder, and a hole transport layer 5, comprised of N,N'-diphenyl-N,N'-bis(3-methyl phenyl)-1,1'-biphenyl-4,4'-diamine dispersed in a polycarbonate resinous binder 7.

Illustrated in FIG. 6 is a positively charged photoresponsive imaging member of the present invention comprised of a substrate 10, a charge transport layer 12, comprised of N,N'-diphenyl-N,N'-bis(3-methyl phenyl)-1,1'-biphenyl-4,4'-diamine dispersed in a polycarbonate resinous binder 14, and a photogenerator layer 16 obtained with the process of the present invention, optionally dispersed in an inactive resinous binder 18.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as Mylar a commercially available polymer, Mylar containing titanium, a layer of an organic or inorganic material having a semiconductive surface layer such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as Makrolon.

The thickness of the substrate layer depends on many factors, including economical considerations, thus this layer may be of substantial thickness, for example, over 3,000 microns; or of minimum thickness providing there are no adverse effects on the system. In one embodiment, the thickness of this layer is from about 75 microns to about 300 microns.

With further regard to the imaging members, the photogenerator layer is preferably comprised of the titanyl phthalocyanine pigments obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.25 micron to about 1 micron, when the photogenerator composition is present in this layer in an amount of 30 to 75 percent by volume. The maximum thickness of this layer in an embodiment is dependent primarily upon factors, such as photosensitivity, electrical properties and mechanical considerations. The charge generator layer can be obtained by dispersion coating the TiOPc obtained with the processes of the present invention, and a binder resin with a suitable solvent. The binder may be omitted. The dispersion can be prepared by mixing and/or milling the TiOPc in equipment such as paint shakers, ball mills, sand mills and attritors. Common grinding media such as glass beads, steel balls or ceramic beads may be used in this equipment. The binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating TiOPc dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate and methoxyethyl acetate, and the like.

The coating of the TiOPc dispersion in embodiments of the present invention can be accomplished with spray, dip or wirebar methods such that the final dry thickness of the charge generator layer is from 0.01 to 30 microns and preferably from 0.1 to 15 microns after being dried at 40° to 150° C. for 5 to 90 minutes.

Illustrative examples of polymeric binder resinous materials that can be selected for the photogenerator pigment include those polymers as disclosed in U.S. Pat. No. 3,121,006, the disclosure of which is totally incorporated herein by reference.

As adhesives, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the hole transporting layer which generally is of a thickness of from about 5 microns to about 75 microns, and preferably of a thickness of from about 10 microns to about 40 microns, include molecules of the following formula:

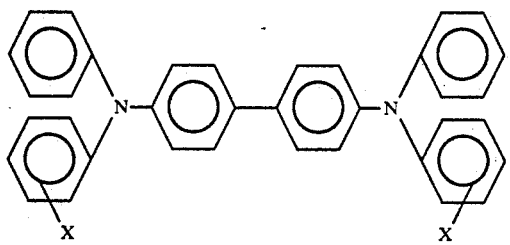

dispersed in a highly insulating and transparent organic resinous binder wherein X is an alkyl group or a halogen, especially those substituents selected from the group consisting of (ortho) CH₃, (para) CH₃, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known hole transporting componds can be selected.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transfering the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

Synthesis of Type I Titanyl Phthalocyanine

To a 300 milliliter three-necked flask fitted with mechanical stirrer, condenser and thermometer maintained under an argon atmosphere was added 32.7 grams (grams) (0.225 mole) of 1,3-diiminoisoindolene, 170 milliliters of N-methyl pyrrolidone and 15.99 grams (0.056 mole) of titanium tetrapropoxide (all the aforementioned reagents are available from Aldrich Chemical Company). The resulting mixture was stirred and warmed to reflux (about 198° C.) for 2 hours. The resultant black suspension was cooled to about 160° C. then was filtered by suction through a 350 milliliter M-porosity sintered glass funnel which had been preheated with boiling dimethyl formamide (DMF). The solid resulting was washed with two 150 milliliter portions of boiling DMF and the filtrate, initially black, became a light blue-green color. The solid was slurried in the funnel with 150 milliliters of boiling DMF and the suspension was filtered. The resulting solid was washed in the funnel with 150 milliliters of DMF at 25° C. then with 50 milliliters of methanol. The resultant shiny dark blue solid was dried at 70° C. overnight to yield 17.4 grams (54 percent) of pigment which was identified as Type I TiOPc on the basis of its XRPD. The elemental analysis of the product was: C, 66.44; H, 2.62; N, 20.00; Ash (TiO₂), 12.35. TiOPc requires: C, 66.67; H, 2.80; N, 19.44; Ash, 13.86.

EXAMPLE II

Synthesis of Type I Titanyl Phthalocyanine

A 1 liter three-necked flask fitted with mechanical stirrer, condenser and thermometer maintained under an atmosphere of argon was charged with diiminoisoindolene (94.3 grams, 0.65 mole), titanium tetrabutoxide (55.3 grams, 0.1625 mole; Aldrich) and 650 milliliters of 1-chloronaphthalene. The mixture was stirred and warmed. At about 140° C. the mixture turned dark green and began to reflux. At this time the condenser was removed and the vapor (this was identified as n-butanol by gas chromatography) was allowed to escape until the reflux temperature reached 230° C. The reaction was maintained at about this temperature for one and one half hours then was cooled to 15° C. Filtration using a 1 liter sintered glass funnel and washing with boiling DMF, then methanol, as in the above Example I provided 69.7 grams (74 percent yield) of blue pigment which was identified as Type I TiOPc by XRPD.

The elemental analysis of the product was: C, 67.38; H, 2.78; N, 19.10; Ash, 13.61. TiOPC requires: C, 66.67; H, 2.80; N, 19.44; Ash, 13.61.

EXAMPLE III

Preparation of Type X Titanyl Phthalocyanine

To a solution of trifluoroacetic acid (100 milliliters) in methylene chloride (400 milliliters) stirred with a magnet in a 1 liter Erlenmeyer flask was added 50 grams of Type I TiOPc, synthesized as in Example I, over a 2 minute period. No heat was evolved and the resultant dark green solution was stirred at room temperature for 15 minutes. The solution was poured over a 2 minute period into a solution of methanol (2.5 liters) and water (2.5 liters), contained in a 12 liter glass cylinder, which was stirred with a 100 millimeters long magnetic stir bar at a rate which was sufficient to create a vortex, which extended almost to the bottom of the flask. Following the addition, the resultant blue suspension was stirred at room temperature for 45 minutes, then was allowed to stand undisturbed for 25 minutes. The yellowish brown supernatant liquid was almost completely separated from the precipitated solid by carefully decanting the reaction vessel. The remaining blue residue was redispersed in 2 liters of methanol by stirring with a magnet for 1 hour at room temperature. The resultant suspension was filtered through an 18 centimeter glass fiber filter in a porcelain filter funnel and the filter cake was washed in succession with $2 \times 100$ milliliters of methanol, $2 \times 100$ milliliters of water, 500 milliliters of water, then $2 \times 100$ milliliters of methanol. The product was dried at 75° C. overnight to provide 47.6 grams (95 percent yield) of dark blue pigment which was identified as Type X TiOPc by XRPD.

EXAMPLE IV

Preparation of Type IV TiOPc

A 20 milliliters aliquot of a solution of 10 grams of Type I TiOPc, prepared in N-methylpyrrolidone solvent as in Example I, in 100 milliliters of a mixture of trifluoroacetic acid in methylene chloride (1:4, v/v) was added over a 2 minute period to a rapidly-stirred solution of methanol (45 milliliters) and water (135 milliliters). The resultant coarse suspension was stirred at room temperature for 35 minutes then was allowed to settle. The supernatant liquid was decanted and the blue residue was redispersed in 100 milliliters of methanol by stirring for 15 minutes. The suspension was filtered using a 7 centimeters diameter glass fiber filter in a porcelain funnel. The solid was washed in the funnel with $2 \times 10$ milliliter portions of methanol, $4 \times 20$ milliliter portions of deionized water and $2 \times 10 \times 20$ milliliter portions of water and $2 \times 10$ milliliter portions of methanol. The solid was dried at 75° C. to yield 1.85 gram of blue pigment identified as Type IV TiOPc by XRPD.

EXAMPLE V

Preparation of Type Z-1 TiOPc

A 20 milliliter aliquot of the acid solution of TiOPc of Example IV was poured over about 1 minute into 100 milliliters of methanol, which was rapidly stired at room temperature in a 125 milliliter Erlenmeyer flask. The resultant dispersion was stirred for 45 minutes, then was filtered using a 7 centimeter glass fiber filter. The solid was washed in the funnel with $2 \times 10$ milliliter portions of methanol, $4 \times 20$ milliliter portions of water and $2 \times 10$ milliliter portions of methanol. The product was dried at 70° C. to provide 2.09 grams of blue pigment identified as Type Z-1 TiOPc by XRPD.

EXAMPLE VI

Preparation of Type Z-2 TiOPc

A solution was prepared by dissolving 6 grams of Type 1 TiOPc, synthesized as in Example I, in 60 milliliters of a 1:4 mixture (v/v) of trifluoroacetic acid and methylene chloride. A 10 milliliter portion of this solution was precipitated into 100 milliliters of a 1:1 mixture of water and ethylene glycol. Phase separation occurred and the pigment and methylene chloride formed sticky lumps on the bottom of the reaction flask. The mixture was stirred for 30 minutes, then the supernatant liquid was decanted and the pigment phase was redispersed in 50 milliliters of methanol. Filtration, washing with water and methanol and drying as in the above three Examples provided 0.90 gram of almost black solid which was identified as a new crystal form of TiOPc, characterized as Type Z-2, from its XRPD.

The titanyl phthalocyanines were evaluated as photogenerators in xerographic imaging devices which were prepared by the following procedure. An aluminized Mylar substrate was coated with a Nylon 8 solution, prepared by dissolving 5 grams of Nylon 8 (Dainippon Ink and Chemical Company) in 24 grams of n-butanol and 4 grams of water using a 1 mil gap applicator. This layer was dried at 135° C. for 20 minutes; the final thickness was measured to be 0.6 micron. A dispersion of the TiOPc was prepared by ball milling 0.35 gram of the TiOPc, respectively, and poly(vinyl butyral) in 13.4 grams of butyl acetate in a 30 milliliter jar containing 70 grams of ⅛ inch stainless steel balls. The dispersion was milled for 20 hours then was coated onto the Nylon 8 layer described above using a 1 mil applicator. The thus formed photogenerating layer was dried at 100° C. for 10 minutes; its final thickness was determined to be about 0.40 micron.

Hole transporting layers solution were prepared by dissolving 5.4 grams of N,N'-diphenyl-N,N-bis(3-methyl phenyl)-1,1'-biphenyl-4,4'-diamine, 8.1 grams of polycarbonate in 52 grams of chlorobenzene. The solution was coated onto the TiOPc generator layer using an 8 mil film applicator. The charge transporting layer thus obtained was dried at 115° C. for 60 minutes to provide a final thickness of about 23 microns.

The xerographic electrical properties of a photoresponsive imaging member prepared as described above were determined by electrostatically charging the surface thereof with a corona discharge source until the surface potential, as measured by a capacitatively coupled probe attached to an electrometer, attained an initial dark value, $V_0$, of $-800$ volts. After resting for 0.5 seconds in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect, was observed. The dark decay in volts per second was calculated as $(V_O-V_{ddp})/0.5$. The percent of photodischarge was calculated as $100\times(V_{ddp}-V_{bg})/V_{ddp}$. The half-exposure energy, $E_{\frac{1}{2}}$, the required exposure energy causing reduction of the $V_{ddp}$ to half of its initial value, was determined. The wavelength of light selected for our measurements was 800 nanometers.

EXAMPLE VII

A xerographic device prepared and evaluated as described in Example VI wherein the photogenerating pigment was Type X TiOPc described in Example III, had the following properties: $V_{ddp}$, 805 volts; dark decay, 27 volts/second; $E_{\frac{1}{2}}$, 1.3 Erg/cm2

EXAMPLE VIII

A xerographic device, prepared and evaluated as described from the Type IV TiOPc described in Example IV, had the following properties: Vddp, 803 volts; dark decay, 56 volts/second; $E_{\frac{1}{2}}$, 1.5 Ergs/cm2.

Other modifications of the present invention may occur to those skilled in the art based upon a review of the present application and these modifications, including equivalents thereof, are intended to be included within the scope of the present invention.

What is claimed is:

1. The X form of titanyl phthalocyanine prepared by a process which comprises dissolving titanyl phthalocyanine in a mixture of trifluoroacetic acid and methylene chloride, and reprecipitating the pigment in a mixture of water and an alcohol.

* * * * *